United States Patent [19]

Hedglen et al.

[11] Patent Number: 5,050,112
[45] Date of Patent: Sep. 17, 1991

[54] SPECIMEN COORDINATE AUTOMATED MEASURING MACHINE/FIDUCIAL AUTOMATED MEASURING MACHINE

[75] Inventors: Robert E. Hedglen, Bethel Park; Howard S. Jacket, Pittsburgh; Allan I. Schwartz, Turtle Creek, all of Pa.

[73] Assignee: The United States of America as represented by the United States Department of Energy, Washington, D.C.

[21] Appl. No.: 390,852

[22] Filed: Aug. 8, 1989

[51] Int. Cl.⁵ .............................................. G01B 5/03
[52] U.S. Cl. ..................................... 364/560; 33/555; 33/548; 33/783
[58] Field of Search .................. 364/560; 33/803, 783, 33/573, 572, 560, 556, 555, 549, 548, 503

[56] References Cited

U.S. PATENT DOCUMENTS

| | | | |
|---|---|---|---|
| 3,102,344 | 9/1963 | Herman | 33/573 X |
| 3,226,833 | 1/1966 | Lemelson | 33/783 |
| 3,670,421 | 6/1972 | Kiewicz et al. | 33/560 X |
| 4,305,207 | 12/1981 | Lantz | 33/572 X |
| 4,665,625 | 5/1987 | Ireland et al. | 33/530 |
| 4,680,865 | 7/1987 | Danielli et al. | 33/549 X |
| 4,908,951 | 3/1990 | Gurny | 33/503 |

OTHER PUBLICATIONS

"Core Tester Contact Assembly" IBM Technical Disclosure Bulletin, vol. 9; No. 3, Aug. 1966; pp. 296-297.

Primary Examiner—Parshotam S. Lall
Assistant Examiner—S. A. Melnick
Attorney, Agent, or Firm—Judy K. Kosovich; William R. Moser; Richard E. Constant

[57] ABSTRACT

The Specimen coordinate Automated Measuring Machine (SCAMM) and the Fiducial Automated Measuring Machine (FAMM) is a computer controlled metrology system capable of measuring length, width, and thickness, and of locating fiducial marks. SCAMM and FAMM have many similarities in their designs, and they can be converted from one to the other without taking them out of the hot cell. Both have means for: supporting a plurality of samples and a standard; controlling the movement of the samples in the +/− X and Y directions; determining the coordinates of the sample; compensating for temperature effects; and verifying the accuracy of the measurements and repeating as necessary. SCAMM and FAMM are designed to be used in hot cells.

9 Claims, 2 Drawing Sheets

SPECIMEN COORDINATE AUTOMATED MEASURING MACHINE/FIDUCIAL AUTOMATED MEASURING MACHINE

The government has rights in this invention pursuant to contract number DE-AC11-76PN00014, awarded by the United States Department of Energy to Westinghouse Electric Corporation.

FIELD OF THE INVENTION

The present invention relates to dimensional measurement equipment and more particularly to a multi-axis equipment capable of measuring dimensional changes of materials or objects which have been exposed to radiation.

BACKGROUND OF THE INVENTION

A materials testing program which involves irradiating specimens of various materials/objects of interest and measuring the changes caused by the exposure. Mechanical measurements of length, width and thickness, and optical measurements of fiducial marks (crosshair patterns scribed on the surface of the specimens at manufacture and which provide measurements of possible flexations at the surface of the specimens) are all desirable.

Many kinds of equipment have been designed to accomplish such measurements, but none have been designed for automated use in a hot cell (the enclosed environment used for working with radioactive materials). The majority of the available coordinate measuring machine designs use air bearings, which require frequent maintenance that would be difficult to perform in a hot cell. Further, the materials of construction required for a radioactive environment are not used sin the coordinate-measuring art. Finally such measurements are normally done in an environment in which the temperature is carefully controlled. This is not possible in a hot cell.

Another important feature that is required in the nuclear field that is not recognized in the coordinate-measuring art is the importance of verifying the accuracy of test results while testing is still going on. A sample undergoing radioactive decay may undergo further change. A sample might returned to a reactor for additional irradiation. In either case, the measurements cannot be duplicated when analysis of results indicates a need for repeating a measurement.

SUMMARY OF THE INVENTION

The SCAMM/FAMM System of the present invention has been conceived as a replacement for all of the above equipment. It is fully computerized and capable of recording, assimilating and reporting data for cognizant technical professionals at nuclear laboratories without the intervention or attention of operating personnel. The SCAMM portion of the system is fully automatic in operation, requiring an operator only to load a frame of specimens into the machine and to start it operating. It is a high speed, highly accurate mechanism whose mode of operation and computer programming will not permit it to made undetected measurement errors and which permit it to minimize the effects of temperature variation—in contrast with a typical gage lab where the Expended Core Facility (ECF) hot cells are not temperature controlled. The FAMM mechanism of the system is basically semi-automatic, requiring an operator to align the reticle in the TV camera with the fiducial mark on the specimen (by use of a track ball) and to press a button to inform the computer system to record and data.

The radiation environment under which these machines must operate dictated significant portions of the design. Stainless steel and aluminum are the basic materials of construction because of the corrosion resistance of the former and the light weight of the latter. Mechanical bearings were chosen in lieu of air bearings because of ease of maintenance and proven reliability. Many commercial components had to be specially radiation hardened or have their designs modified to survive the hostile environment. Most components were radiation tested in an Advanced Test Reactor (ATR) gamma test facility prior to application. All parts of the machines were designed with a view toward making normal in-cell maintenance operations as easy to accomplish as possible by using slaves. All anticipated maintenance operations can be accomplished in-cell.

In measuring the dimensional changes of the materials, the SCAMM mechanism uses a combination of a movable platform, a support arm and movable probes to measure the width, length and thickness of the material. To measure the optical fiducial marks scribed on the materials, a FAMM mechanism which, but for the type of measurement instruments used, is the same as the SCAMM mechanism, is used. Here each point of the fiducial mark on the surface of the material is measured by a camera while, at the same time, the temperature existing at the same point is measured by an infra-red thermometer, to compensate for temperature fluctuations within the ECF hot cells . . . , or as a result of heat generation (caused by radiation) within the specimen.

Both the SCAMM and the FAMM mechanisms are controlled by a controller which includes a host computer, a computerized motor control, a storage memory and a data acquisition system. The computerized motor control provides instructions to the SCAMM and FAMM mechanisms while the data acquisition system acquires the data points elicited respectively therefrom. The thus acquired data is stored in the memory storage. And by comparing the collected data with predetermined standardized data, and by providing interfacing instructions to both the data acquisition system and the computerized motor control, the dimensional changes of the materials are determined.

It is therefore an objective of the present invention to provide a computerized and simplified system to measure the dimensional changes, if any, of materials which have been exposed to radiation.

The above mentioned objective and advantages of the present invention will become more apparent and the invention itself will be best understood by reference to the following description of embodiments of the invention taken in conjunction with the accompanying drawings wherein:

DETAILED DESCRIPTION OF THE INVENTION

Figure 1:
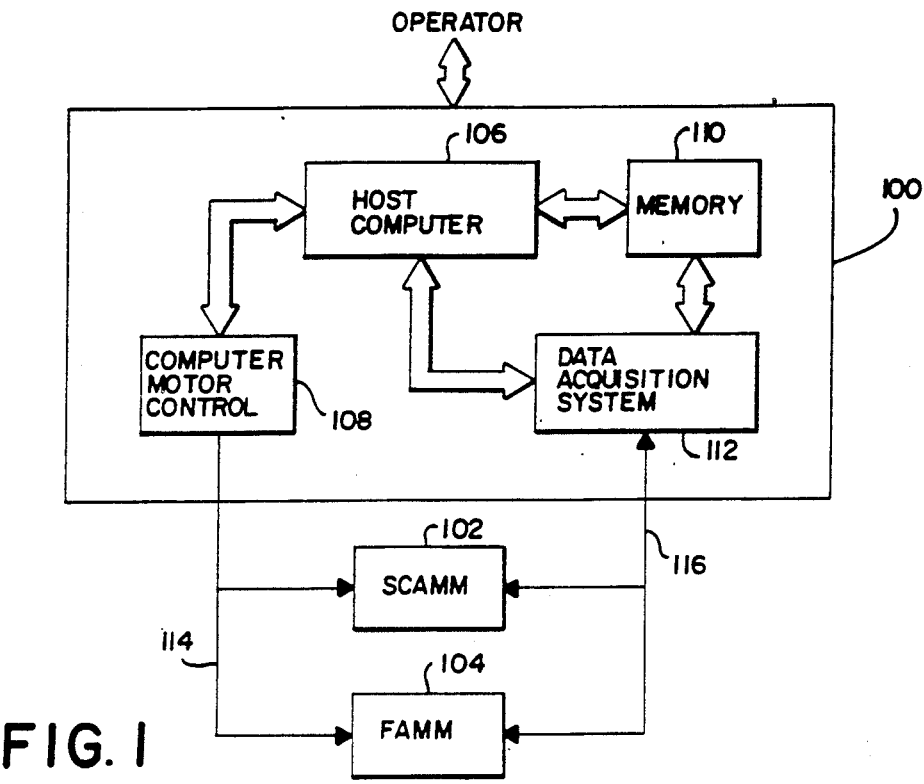
FIG. 1 is a simplified block diagram of the present invention system which has separate SCAMM and FAMM machines/mechanisms.

Referring to FIG. 1, an overall view of the present invention system is given. As shown, the FIG. 1 embodiment has a controller 100, a SCAMM machine 102 and a FAMM machine 104. Within controller 100 there is a host computer 106, a computerized motor control 108, a memory storage 110 and a data acquisition system 112. Host computer 106 interfaces with computerized motor control 108, memory 110 and data acquisition system 112. Host computer 106 and computerized motor control 108 may be separate computer systems, to be discussed later. The instructions to control the movement of SCAMM machine 102 and FAMM machine 104 is provided by computerized motor control 108 via line 114. The interfacing between data acquisition system 112 and SCAMM machine 102 and FAMM machine 104 is provided via line 116. A particular way in which the respective SCAMM and FAMM machines operate with respect to machine 100 will be given in detail later.

Figure 2:
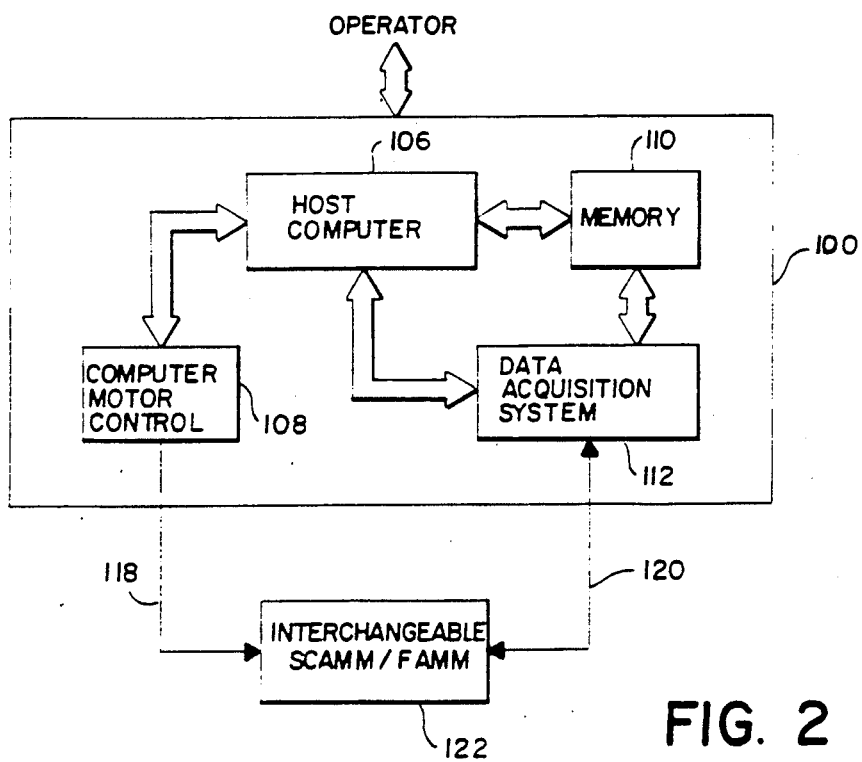
FIG. 2 is a simplified block diagram of an embodiment of the present invention which has an interchangeable SCAMM/FAMM machine/mechanism.

In FIG. 2, there is shown a second embodiment of the present invention which uses one interchangeable SCAMM/FAMM machine 122 in place of separate SCAMM and FAMM machines. The respective instructions to and data collected from machine 112 are provided from controller 100 via lines 118 and 120, respectively. The FIG. 2 embodiment is used in situations where there is no need to measure the dimensions and the fiducial data of the materials simultaneously, or in the alternative, when cost considerations dictate that only one machine be used, as both the SCAMM and FAMM machines are identical except for the respective measuring instruments.

Specifically, SCAMM machine 102 and FAMM machine 104 are four axis measuring machines which utilize a common basic design and measuring devices which permit each unit to function in its intended manner. Components for movement along the X and Y axes, the two Z-axis stands, and the metrology and motion control systems comprise the basic motion system and are common to both SCAMM and FAMM machines. When operated as a SCAMM machine, two measuring heads are mounted atom the Z-axis stands, and specialized computer control and programming are utilized to direct operations. When operated as a FAMM machine, a camera head and light are placed atop one Z-axis stand and an infra-red thermometer atop the other, and the control and programming are tailored to the requirements of this equipment and function.

The control of the two machines utilized two computer systems 106 and 108 and one data acquisition system 112. The data acquisition system 112 is responsible for tracking each of the axis positions and serves as a fast communication controller between the two computers. One of the computer systems, a Hewlett Packard Vectra PC, is dedicated to being a motor controller 108, using plug-in stepper motor cards capable of microstepping the motors in increments as small as 1/25,000 of a revolution. The other computer, a Hewlett Packard Series 300 work-station, acts as host computer 106, supervising all aspects of the machine's operation and is the operator interface to the system. The workstation also contains all the data files necessary for measuring the specimens. By modifying these data files with an editor, the functions of the machine can be changed or the position of the measurements on the specimens can be altered. This makes it easy to add new types of specimens or modify the measurement patterns on existing ones. Once the structure of each type of data file is known, no software programming experience is needed beyond the knowledge of how to use a text editor or a word processor.

Figure 3:
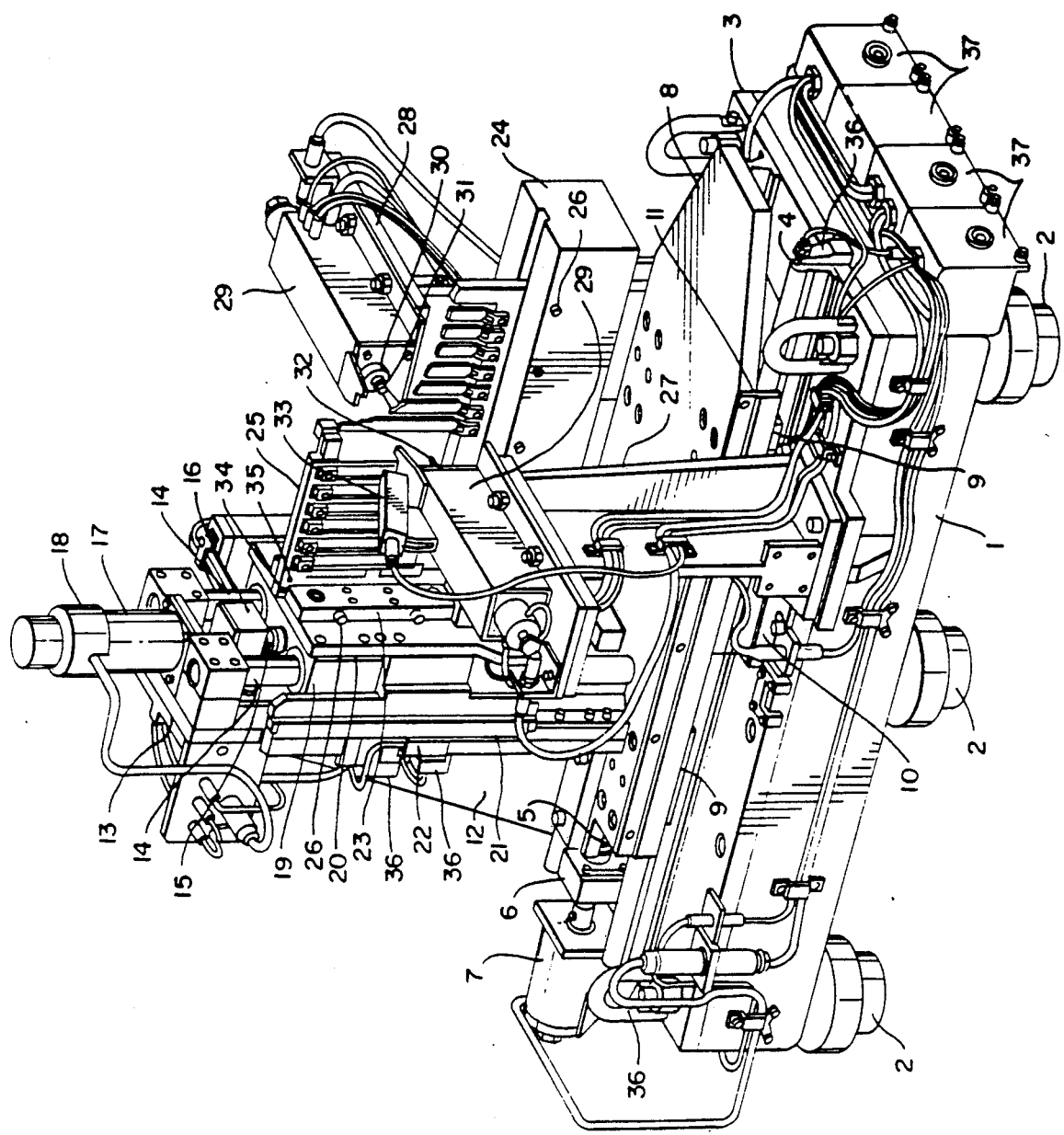
FIG. 3 is a perspective view of a mechanism which has been outfitted to perform SCAMM functions.

With reference to FIG. 3, base 1 of a representative machine, in this instance outfitted to perform the SCAMM functions, consists of a massive carbon steel box beam structure (chrome plated to resist corrosion) which provides the rigidity and stability necessary for proper functioning. The base is supported by six vibration dampers 2 which isolate the machine from its environment. A base plate 3, a pair of fully supported Thomson rails 4, a precision ground ball screw 5 and its associated mounting bearings 6 and drive motor 7 are all mounted on the base. Except for the motor, these are all fabricated of stainless steel. A top plate (platform) 8 is mounted on the rails via eight Thomson linear bearings 9. A double loaded precision ball nut (not visible in FIG. 3) is used to connect the top plate to the base plate. These elements are also of stainless steel construction. The components thus far noted comprise the drive portion of the X axis.

A double loaded ball nut, when coupled with the duplexed angular contact ball bearings which support the motor end of ball screw 5 and deep row radial bearing that supports the other end, permits essentially zero axial play between the X axis drive motor/ball screw combination and top plate 8—a condition which is vital for proper functioning of the machine at the required high accuracies.

High Accuracy Sony MAGNESCALE linear transducers have been chosen for all metrology measurements primarily because of their resistance to the effects of radiation. Additionally, in their High Accuracy versions, they approach the performance of the optical transducers normally used in this type of application. The X axis Sony transducer is not visible in FIG. 3, its body being mounted to a skirt 11 and its slider being mounted to a fixed bracket 10. Any rotation of the X axis motor will produce an X direction motion of top plate 8, which in turn will cause a relative motion between the Sony transducer body and its slider, and hence produce an X axis reading.

A massive Y axis mounting angle plate 12, i.e. a column beam, is fastened to top plate 8 and moves with it. The Y axis beam utilizes essentially the same driving components as the X axis motor/ball screw combination and is fastened to angle plate 12. Elements 13, 14, 15, 16, 17, 19, 20, 21 and 22 are the axis base plate, Thomson rails, ball screw, ball screw support bearings, drive motor, Thomson bearings, top plate, MAGNESCALE body and slider, respectively. In an identical manner to the X axis, any rotation of the Y axis motor will produce a reading on the Y axis MAGNESCALE transducer.

Because of the design features (requirements) of the Thomson linear bearing, it was not possible to fully support the Y-axis rails. The lower half of each rail is fully supported, and the upper half is supported only at its end. This approach permitted the use of open Thomson bearings and fully supported rails in the lower region (where gravity loads the bearing properly) and the use of a full bearing to carry the loads in the upper half. This design approach plus the use of larger rails and bearings minimized rail deflection due to the weight of the specimens. Since ball screw 15 is an extremely low friction device, the weight of the Y axis will cause it to free-wheel down whenever the drive motor is not energized (i.e., not in a run or hold mode). It is therefore necessary to utilize a normally energized electric brake 18 to prevent such motion. Brake 18 is applied whenever there is no power to the drive motor and is electrically released concurrent with the application of power to the motor.

Stainless steel capture plates 23 and an aluminum support arm 24 are fastened to the Y axis top plate and form the basis for the test specimen and operating standards support system. A specimen frame 25 is of aluminum construction and utilizes zircaloy specimen clamps. The design of the frame varies with the requirements of the specimens to be used: the one shown is for a "standard narrow specimen", and can hold 12 specimens and a standard. Specimen frame 25 is clamped to the capture plates and support arm 24 by capture screws 26, an operation which takes only a few minutes in a hot cell.

Elements 27 and 28 are the Z-axis primary and secondary support stands. The primary stand is so named because it is closest to the hot cell window, is most visible, and is programmed to do most of the measurements in SCAMM operation. Other elements shown in the figure, but not discussed, are limit switches 36 to prevent X and Y axis over-travel and junction boxes 37 which carry electric power and signals between the SCAMM machine and its control system (i.e. controller 100), that is located out of cell on the hot cell gallery floor.

All the elements thus far discussed are common to both SCAMM and FAMM operation. As can be seen from the figure, any motion of either the X or the Y axis will result in a one-to-one corresponding motion of the test specimen. The MAGNESCALE instruments used have an accuracy of 0.000060" (60 micro-inches) and a minimum resolution of 20 micro-inches. The X and Y axis ball screws have a lead of 0.200 inches and a control system capable of moving the stepper (drive) motors 1/25,000 of a revolution, thus imparting a minimum X or Y motion of 8 micro-inches. It can be seen that both SCAMM and FAMM have the capability of imparting minute motions to the test specimens in both the X and Y directions, and of measuring them.

For dedicated SCAMM operation, two measuring heads 29 (FIG. 3) are installed respectively on the primary and secondary stands to operate the system in the SCAMM mode. They are fully interchangeable and each contains a stepper motor, ball bearing suspension system, double loaded ball screw, High Accuracy MAGNESCALE transducers and a Renishaw five-way trigger probe. These mechanisms will be the subject of a separate disclosure. For this discussion, it is only necessary to note that ram 30 is connected to the drive motor, MAGNESCALE (not shown) and trigger probe 31, and that any motion of ram 30 results in a one-to-one corresponding motion of both components. In the same manner as the X and Y axes, the minimum in or out motion of ram 30 is 4 micro-inches (its ball screw has a lead of 0.100 inches).

The Renishaw trigger probe is a commercially available device used for making +/−X, +/−Y and +Z (axially inward toward the center of the machine) measurements on most Coordinate Measuring Machines manufactured in the world. Basically, the device is a highly accurate, highly reproducible switch which opens a circuit whenever its stylus 32 touches the element to be measured. As supplied by its manufacturer, the plastic internal components of the probe failed after gamma exposure about $2 \times 10^7$R. By having the probes rebuilt with a more suitable plastic, polyetheretherketone (PEEK), using a more appropriate lubricant, life has been extended to about $3 \times 10^8$R.

Element 33 is a Mikron Instrument Co. infra-red thermometer which permits high speed non-contact temperature measurements of the test specimen as it is being measured dimensionally. As originally supplied by the manufacturer, it contained an amplification system in the head which failed after a gamma exposure of $10^6$R. By modifying the design so that the electronics are mounted external to the hot cell (the head only contains lens, detection and ambient temperature compensation systems), life was extended to about $1.5 \times 10^8$R. The IR thermometer permits the cognizant technical professionals to apply appropriate temperature corrections to their data, if they choose.

The SCAMM mode is programmed so that the primary measuring head makes most of the measurements. It could just as easily have been programmed so that the secondary head (or both heads) performed the same function. The trigger probes 31 are used for making all SCAMM measurements. The X,Y,Z motion of the machine places the stylus 32 (stylii) at the point of interest, and the instant the probe is triggered (i.e. its circuit is interrupted), the position of the appropriate linear MAGNESCALE transducers is read. This action occurs so fast that there is essentially zero time lapse between the probe trip and the recording of the data.

Each SCAMM/FAMM specimen frame contains a set of highly accurate tungsten carbide standards which are being continually used to calibrate the machine and which can be used to perform a shortened qualification to demonstrate that the machine is functioning within specifications.

The following sequence is followed when a SCAMM measurement is made. Motions are extremely precise and reproducible and must be performed under computer control (human reactions are just too slow and imprecise). The X,Y,Z motion of the machine places a Renishaw trigger probe at the point to be measured. The stylus is advanced until the probe triggers, thus locating the surface. It is then withdrawn a specified distance from the surface. A reading is made by advancing the probe until it triggers, the data is recorded (and fed to memory 110), and the probe withdrawn a preset amount, a sequence which is repeated five times. The means and standard deviation (sigma) of the readings is computed (in host computer 106), and if the computed sigma is less than or equal to a preset value, the mean is accepted as the reading and the SCAMM mode proceeds to the next programmed point. If the sigma requirement is not met, the reading is repeated, and will continue to be repeated until the requirement is met. Thus, if SCAMM data is not reproducible, no data will be recorded.

In SCAMM mode, a length, the longest dimension of the specimens as shown in FIG. 3, is measured in the following manner. The stylus is placed above (or below) the specimen at the point to be measured. The Y axis moves the specimen into the stylus, following the locate and read sequence outlined above. When the sigma requirement is met (currently 0.000035" is used), the reading is recorded. Sometime later in the measuring sequence the process is repeated at the opposite end of the specimen. The two readings are subtracted, corrected by the calibration coefficient and recorded as the reading. The same procedure is followed for measuring a width, indicated as the short dimension in FIG. 3, except the X axis is used to drive the specimen into the stylus. Thickness is measured by placing the stylii at the point to be measured, and driving first the secondary and then the primary probe into contact with the surface. Again the locate and five sample procedure is used. The readings are summed and the mean and sigma are computed. Since the result of these measurements is a complete thickness, sigma is currently set at 0.000045 inches. When the criteria are met, the mean is corrected by the calibration coefficient and the data recorded.

Since there is no way to control the ambient temperature in the hot cell, the SCAMM measurements taken have to be constantly recalibrated as the measurements proceed. In the case of width or length, an accurately known standard is measured, and the known dimension used to compute a coefficient which will result in a correct reading. In essence, the calibration coefficient removes the effect of the stylus ball diameter, the stylus deflection, the probe pre-travel and the effects of temperature on the machine structure and linear transducers. The calibration is checked by measuring the standard and requiring the result to be within a preset limit of the known dimension. For the length and width as shown in FIG. 3, the permissible errors are currently 0.000100" and 0.000040" respectively. Thickness is calibrated in exactly the same manner.

In this case, calibration removes all the effects cited above, but also the variable caused by the position of the probe within the measuring head ram and the variability caused by manufacturing differences in probes and stylii. The permissible thickness check is also 0.000040". Unless successful calibrations are being achieved, assigned SCAMM tasks in the mode are not permitted to proceed. Since the machine is calibrated in all three dimensions at the beginning and end of each specimen, it cannot produce any data unless it is continually demonstrating that it is functioning properly.

When loading specimens into frame 25, it is necessary for the technician to record both the position used for a specimen and the serial number borne by it. There is no required relationship between when a frame is loaded and when it is measured. Frame 25 is installed in the machine and the machine started. The first operating sequence is to locate the bottom and left side of the frame orientation box, a rectangular depression or hole in the upper left part of the frame designated 34 in FIG. 3. This initializes the X and Y axes (and accommodates any machining variation for different frames and a less than perfect frame installation). It also gives computer 106 sufficient information to locate identification holes 35. The pattern of these drilled holes is interpreted by the computer as a binary code corresponding to the frame serial number. The code is read using the primary trigger probe in the Z direction. Once the frame has been identified, the computer knows where every specimen position in the frame is located, the values of every standard in it and the location of standards. To insure interchangeability, the orientation box and identification holes are in exactly the same position in every SCAMM frame.

A software-generated picture of the frame now appears on the computer screen. The computer also contains a listing of the serial numbers of every test specimen currently being used. Using the serial number listing made when the frame was loaded, the operator "informs" the computer of the location and serial number of each specimen in the frame. When completed, the computer displays a picture of the frame which contains the correct serial numbers in the appropriate specimen position locations. Each serial number in the computer listing has a measurement pattern associated with it, hence the control system knows exactly which sequence of measurements it must perform on each specimen. After verification that the picture is correct, the SCAMM operation is directed to continue. From this point on, the operation is fully automatic and no further technician input or supervision is required until all specimens have been measured and a new frame must be installed.

After calibration, the machine proceeds to the first specimen location and determines the exact position of that specimen in space. If it is determined that the specimen is not parallel to the machine axes (for any reason such a skewed installation), the specimen will be rotated analytically, so measurements are always made at the correct points. This operation also provides the computer with the machine coordinates of the lower left corner of the specimen, and hence the X,Y position of every required measurement is known. The machine now proceeds with the required measurements, intermixing length, width and thickness readings so as to obtain the most efficient (least time consuming) mode of operation. Upon completion of the specified program, the data are tabulated and saved as a file on a floppy disk (or memory 110), and the sequence repeated for the next specimen. After all measurements for a frame are completed, the data files are ready to be transmitted to the cognizant technical professionals. The specimens can now be removed from the frame and readied for their next operation, or the frame moved to the FAMM machine for fiducial measurements.

In the event that only one machine is available and it is desired to make FAMM measurement, a SCAMM machine can be converted into a FAMM machine for dedicated FAMM operation as follows.

Measuring head 29 of the primary stand is removed from the primary stand and replaced by a camera head with integrally mounted fiber optic ring light, and measuring head 29 of the secondary stand is replaced by an infra-red thermometer (the same thermometer 33 discussed above can be used). The electrical in-cell conversion is accomplished by connecting the primary measuring head motor and limit switch leads to the camera head focusing motor and limit switches; connecting the secondary measuring head motor lead to the camera head rotating motor; and terminating (shorting) the unused secondary limit switch and both trigger probe leads. In a machine fabricated only to operate in the FAMM mode, the "unused leads" would not have been installed. External to the cell, a video and lighting control, video monitor and track ball are added to the control system. FAMM software differs from SCAMM software since the measuring head functions are no longer required and are replaced by camera/fiducial functions.

Briefly, the camera, head which is the heart of the unit, is a Rees Instrument Co. radiation resistant TV camera, with a microscope lens and optical tube (which provide a magnification of about 60×), and mounted in double containment. Currently, the vidicon tube has a single pair of cross-hairs (reticle) etched on it. The camera is mounted in a carriage, which permits fore and aft motion on linear bearings and rotary motion on internal V blocks. A fiber-optic ringlight is mounted to an extension on the front of the camera and coaxial with the microscope optical tube. It provides cold, uniform, circumferentially distributed severe side lighting which results in high contrast, evenly lit fiducial marks.

The fore and aft motion of the camera is used for focusing, and is accomplished by driving a ball screw with the primary motor control system. Two focusing speeds are available, high speed for coarse adjustment and low speed for fine adjustment. Another motor, connected to the secondary motor control system, is used to rotate and align the camera reticle and the fiducial mark on the specimen. This feature permits accommodation of specimens installed in a slightly skewed manner or warpage of the specimen surface. To preclude errors, the software limits the rotary adjustment to the first data point only. Both rotation and focusing are accomplished by using the track ball.

For FAMM mode, the infra-red thermometer is mounted coaxially with the camera and on the other side of the specimen. Every time a fiducial data point is recorded, the temperature of that point is also recorded, and reported to the cognizant technical professionals for data correction as they choose.

The FAMM machine uses identically the same specimen frame as the SCAMM machine, and the serial numbers of the specimens mounted in the frame is handled in the same manner. Each frame has a fiducial standard which consists of a highly polished tungsten carbide "specimen" with an X,Y pattern etched-on it. The standard manufacturer calibrates this etched pattern to an accuracy of 0.00001 inches. As is the case with the SCAMM mode, for FAMM operation, each specimen is calibrated before and after measuring. Calibration has the effect of negating temperature effects on the machine structure and the X and Y axis linear transducers. Qualification of FAMM is accomplished by measuring the entire etched pattern on the standard and comparing the results to the data supplied by the manufacturer. The analysis techniques are the same as used for the SCAMM mode.

FAMM start-up is similar to that of SCAMM, except that the frame serial number must be manually entered into the computer. An automatic optical identification system is currently under development. As before, the frame serial number identifies the dimensions and pattern of the standard and the locations of the specimen positions. The same scheme is used to identify the serial number of the specimen that is in any frame slot, and that serial number also identifies the correct measurement pattern.

Once calibrated, the X-Y positioning system automatically positions the camera approximately over the first fiducial point to be measured. Using the track ball, the camera is focused and the reticle in the camera is aligned with the fiducial mark in the X, Y and rotary directions. FAMM has minute X-Y adjustment capability. When X, Y and rotary alignment have been achieved, a button on the track ball is depressed, preventing any further rotation of the camera until the next specimen and displacing the reticle about 0.001" (real, not magnified distance) from the fiducial. The X and Y alignment and the displacement are repeated a total of three times. In both X and Y, the mean and sigma of the readings are computed and sigma compared to a preset value. If sigma is less than or equal to this value, the mean is accepted as the reading and FAMM automatically advances to the vicinity of the next data point, where the process is repeated. If the sigma requirements are not met, the operator must repeat the point until they are. If FAMM data are not reproducible, no data is recorded.

This self checking feature provides for a preset sigma value for FAMM of 0.00010", a value which is only 40% of that used previously (0.00025"). It is judged that the improvement in FAMM is due primarily to the lighting system, and to a lesser extent, to the ability to rotate the camera in very small, controlled increments.

The FAMM operation is less automatic than the SCAMM operation to the extent that the operator must align the camera reticle and fiducial mark by hand, using a track ball to "inform" the computer how the specimen must be moved. This effort requires his undivided attention. When the data taking process is completed, it is automatically assimilated, tabulated and sent (via ethernet) to the cognizant technical professionals.

We claim:

1. Automated dimensional measurement apparatus for measuring in a hot cell environment three-dimensional changes in specimens that have been exposed to radiation, wherein the apparatus consists essentially of materials that can withstand a radiation exposure of at least $10^8$R, said apparatus having orthogonal X, Y, and Z axes, comprising:

means for supporting a specimen frame that contains a plurality of specimens and at least one standard, each specimen having X, Y, and Z dimensions;

means for identifying the specimen frame and its characteristics so as to facilitate identifying and measuring each specimen in the frame;

means for controlling the movement of the specimen frame and specimens in the $+/-$X and Y directions;

two measuring heads, one mounted on the $+$Z side of the specimen frame, the other mounted on the $-$Z side of the specimen frame, each moveable in the $+/-$Z direction, and each having a means for detecting the touching of a specimen;

means for converting the coordinates of the touching of a specimen to the dimensions of the specimen;

means for detecting the temperature of the specimens and correcting the measured dimensions for temperature effects so that temperature variations that are encountered do not adversely affect measurement accuracy;

means for repeating and statistically evaluating the measurements to achieve the desired accuracy before measuring is determined to be completed.

2. The apparatus of claim 1 wherein:

the X axis has a base plate with linear bearings aligned in the X direction, with a slidably mounted platform over the base;

the Y axis has a base plate mounted on the platform of the X axis, linear bearings aligned in the Y direction, and a slidably mounted assembly containing a capture plate that secures a specimen frame;

said specimen frame has identifying and orienting means that allow it to be automatically recognized by the controlling means;

the means for measuring temperature is an infrared thermometer mounted atop one of the measuring heads and directed at the specimen undergoing measurement;

the means for controlling movement in the $+/-$X and Y directions includes a means for storing collected dimensional and temperature data, a means for identifying the specimen frame and its characteristics, a means for analyzing data to determine dimensions and whether additional measurements are needed to attain the desired precision.

3. Semi-automated measurement apparatus for determining in a hot cell environment the changes in location of fiducial marks on specimens that have been exposed to radiation, wherein the apparatus consists essentially of materials that can withstand a radiation exposure of at least $10^8$R, said apparatus having orthogonal X, Y, and Z axes, comprising:

means for supporting a specimen frame that contains a plurality of specimens and at least one standard;

means for controlling the movement of said specimen frame and specimens in the +/−X and Y directions;

means for aligning a viewing device with the fiducial marks while viewing along the Z axis, said viewing device accessible to a viewer through a window in the hot cell;

means for converting the coordinates of the aligned viewing device to the location of the fiducial marks on the sample;

means for detecting the temperature of the sample and correcting the measured location for temperature effects, said means for detecting temperature located opposite the viewing device along the Z axis;

means for repeating and statistically evaluating the measurements to achieve the desired accuracy before measuring of location of fiducial marks is determined to be completed.

4. The apparatus of claim 3 wherein:

the X axis has a base plate with linear bearings aligned in the X direction, with a slidably mounted platform over the base;

the Y axis has a base plate mounted on the platform of the X axis, linear bearings aligned in the Y direction, and a slidably mounted assembly containing a capture plate that secures a specimen frame;

the means for measuring temperature is an infrared thermometer mounted opposite and coaxially to the viewing device, along the Z dimension;

the viewing device is a camera with cross-hairs accessible to a viewer through a window in the hot cell;

the means for controlling movement in the +/−X and Y directions includes a means for storing collected dimensional and temperature data, a means for analyzing data to determine location of the fiducial markings and whether additional measurements are needed to attain the desired precision.

5. The apparatus of claim 1, wherein the apparatus can be adapted to determine the location of fiducial marks by removing the two measuring heads for detecting the touching of a sample and replacing one head with a viewing device and the other with a means for measuring temperature, wherein the apparatus design allows removing and replacing the measuring heads within the hot cell environment, and wherein the apparatus also comprises:

means for supporting a specimen frame that contains a plurality of specimens and at least one standard;

means for controlling the movement of said specimen frame and specimens in the +/−X and Y directions;

means for aligning the viewing device with the fiducial marks while viewing along the Z axis, said viewing device accessible to a viewer through a window in the hot cell;

means for converting the coordinates of the aligned viewing device to the location of the fiducial marks on the sample;

means for detecting the temperature of the sample and correcting the measured location for temperature effects so that temperature variations that are encountered do not adversely affect measurement accuracy, said means for detecting temperature located opposite the viewing device along the Z axis;

means for repeating and statistically evaluating the measurements to achieve the desired accuracy before measuring of location of fiducial marks is determined to be completed.

6. The apparatus of claim 3 wherein the apparatus can be adapted to measure the changes in the three dimensions of specimens by removing the viewing device and removing the means for measuring temperature and replacing each with a measuring head, wherein removing and replacing of the viewing device and the means for measuring temperature can be done within the hot cell environment, and wherein the apparatus also comprises:

means for supporting a specimen frame that contains a plurality of specimens and at least one standard, each means for supporting a specimen frame that contains a plurality of specimens and at least one standard, each specimen having X, Y, and Z dimensions;

means for identifying the specimen frame and its characteristics so as to facilitate identifying and measuring each specimen in the frame;

means for controlling the movement of the specimen frame and specimens in the +/−X and Y directions;

two measuring heads, one mounted on the +Z side of the specimen frame, the other mounted on the −Z side of the specimen frame, each moveable in the +/−Z direction, and each having a means for detecting the touching of a specimen;

means for converting the coordinates of the touching of a specimen to the dimensions of the specimen;

means for detecting the temperature of the specimens and correcting the measured dimensions for temperature effects so that temperature variations that are encountered do not adversely affect measurement accuracy;

means for repeating and statistically evaluating the measurements to achieve the desired accuracy before measuring is determined to be completed.

7. A three-dimensional method for measuring dimensional changes in samples in a hot cell comprising:

supporting a specimen frame that contains a plurality of specimens and at least one standard, each specimen having X, Y, and Z dimensions;

controlling the movement of the specimen frame and specimens in the +/−X and Y directions;

making measurements along the +/−Z direction at a desired X and Y location of the specimen frame;

converting the X and Y coordinates of the specimen frame to desired dimensional measurements;

detecting the temperature of the specimens and correcting the desired dimensional measurements for temperature effects so that temperature variations that are encountered do not adversely affect measurement accuracy;

repeating and statistically evaluating the measurements to achieve the desired accuracy before measuring is determined to be completed.

8. The method of claim 7 wherein the dimensional changes being measured are the X, Y, and Z dimensions of the specimens, and wherein two measuring heads, one mounted on the +Z side of the specimen frame and the other mounted on the −Z side of the specimen frame detect touching of the sample, thereby allowing measurement of Z dimensions and allowing the X and Y coordinates of the specimen frame to be determined so that the X and Y dimensions can be calculated.

9. The method of claim 7 wherein the dimensional changes being measured are the location of fiducial marks on the specimens, and wherein a camera with crosshairs is mounted on the side of the specimen frame accessible to viewing through a window in the hot cell and a temperature-measuring device is mounted on the side of the specimen frame opposite the window, and wherein a viewer aligns the crosshairs with the fiducial marks and, once aligned, the coordinates of the specimen frame are determined and the location of the fiducial marks thereby determined.

* * * * *